July 24, 1956  V. A. BELL  2,755,898
MECHANISM FOR STORING ENERGY
Filed Jan. 12, 1953  3 Sheets-Sheet 2

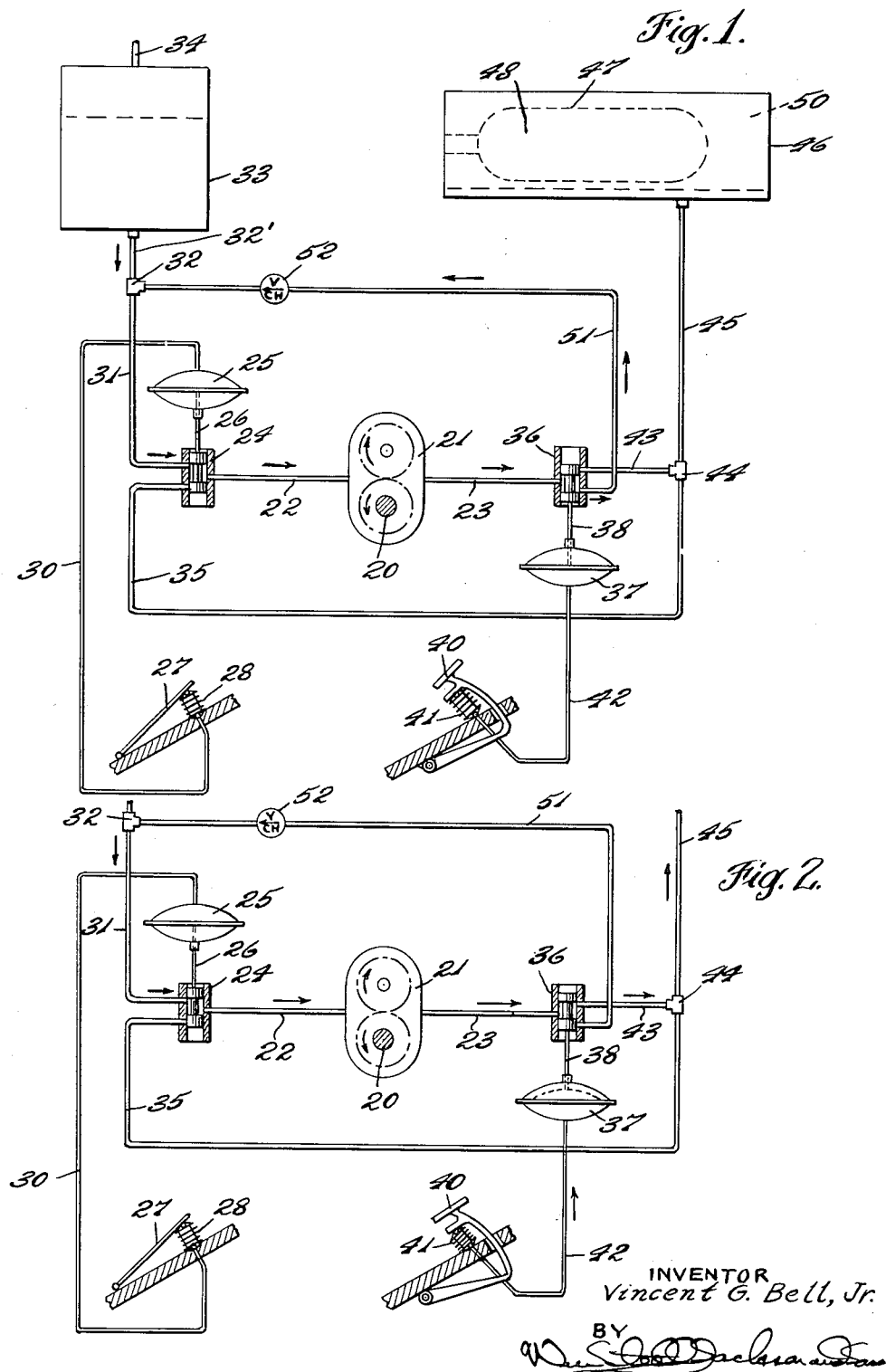

INVENTOR
Vincent G. Bell, Jr.
BY
ATTORNEYS

July 24, 1956
V. A. BELL
2,755,898
MECHANISM FOR STORING ENERGY
Filed Jan. 12, 1953
3 Sheets-Sheet 3
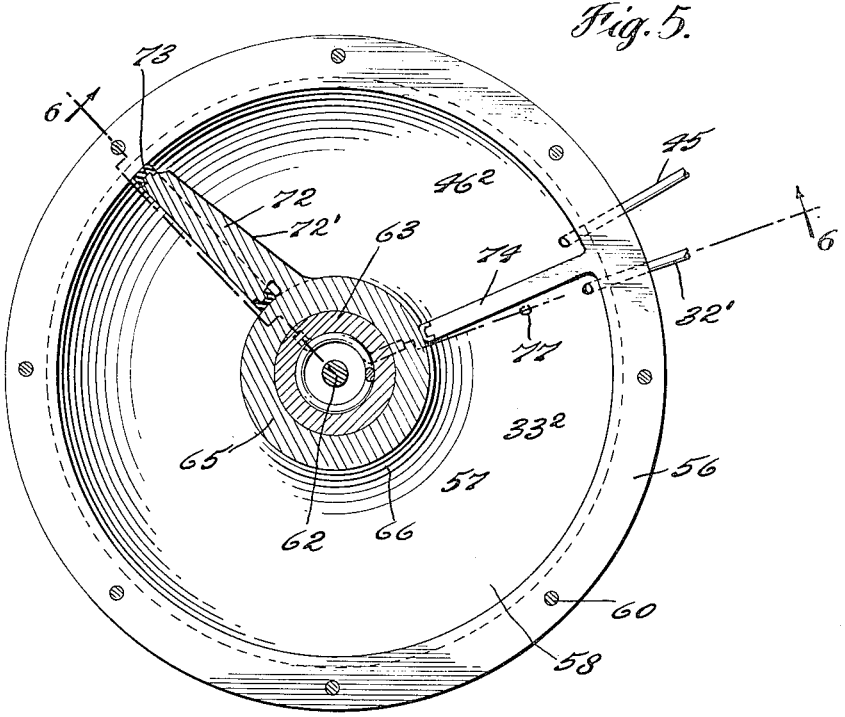
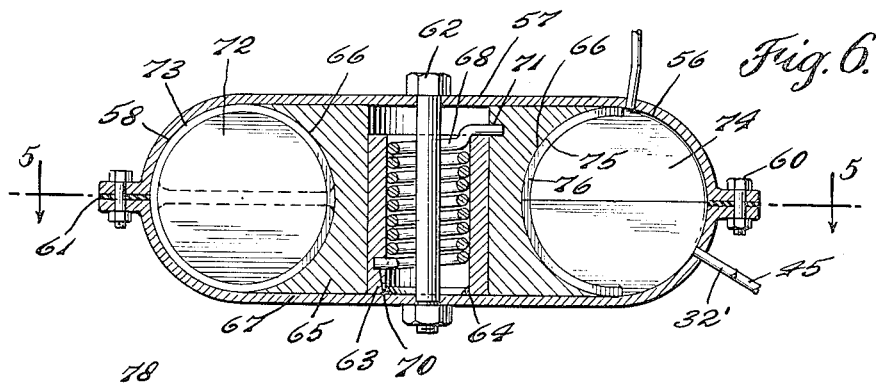
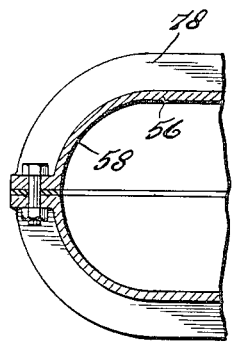
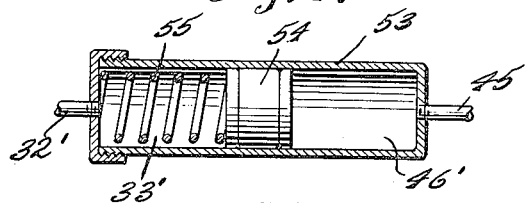
INVENTOR
Vincent G. Bell, Jr.
BY
ATTORNEYS

United States Patent Office 2,755,898
Patented July 24, 1956

2,755,898

MECHANISM FOR STORING ENERGY

Vincent A. Bell, Mount Airy, Pa.

Application January 12, 1953, Serial No. 330,881

6 Claims. (Cl. 192—3)

The present invention relates to a system for storing and utilizing energy incident to braking of a machine and an accumulator and sump useful generally and especially in such a system.

A purpose of the invention is to store braking energy in an accumulator and utilize it for emergency acceleration by passing it through a pump.

A further purpose is to recirculate fluid around the pump in normal operation, to pump the fluid through the pump into an accumulator in braking and thus to store energy and to release the fluid from the accumulator through the pump for emergency acceleration.

A further purpose is to employ a vessel as a combined accumulator and sump, providing a movable wall which varies its position as fluid passes from the sump to the accumulator and vice versa.

A further purpose is to make an accumulator desirably also combined with a sump in a tire form, having a movable wall and a fixed wall sealing with respect to one another and with respect to the casing as the movable wall changes its position.

A further purpose is to employ an accumulator casing whose cross section at the outside conforms to a circle, and desirably also to use a hub on the movable wall whose cross section conforms to the same circle.

A further purpose is to push the movable wall toward one limiting position by a spring.

A further purpose is to provide cooling fins on the accumulator casing.

Further purposes appear in the specification and in the claims.

In the drawings I have chosen to illustrate a few only of the numerous embodiments of my invention, selecting the forms shown from the standpoints of convenience in illustration, satisfactory operation and clear demonstration of the principles involved.

Figures 1 to 3 are diagrams of the system of the invention, Figure 1 showing normal operation, Figure 2 showing braking and Figure 3 showing abnormal acceleration, Figures 2 and 3 omitting the sump and accumulator for convenience in illustration.

Figure 5 is a section of a combined sump and accumulator on the line 5—5 of Figure 6.

Figure 6 is a section on the line 6—6 of Figure 5.

Figure 7 is a fragmentary section corresponding to Figure 6 showing cooling fins on the casing.

Figure 8 is an axial section showing a floating piston type of combined sump and accumulator which will be employed as a variation.

In many machines, particularly vehicles such as automobiles and trucks, but also in textile, metal working and other machines which speed up and slow down frequently, considerable energy is wasted by braking, which could usefully be used in accelerating, especially in emergencies.

Furthermore, in many cases, braking is accomplished by bands and the like which undergo excessive wear and require frequent replacement.

In accordance with the present invention, braking energy is stored by fluid compression, and this energy is made available, especially in situations where abnormal acceleration is required. Thus the wear on brake bands and the like is reduced, and energy is correspondingly conserved.

In the preferred embodiment, an improved form of accumulator is used which has the shape of a tire, and permissibly can be stored in the space provided in a vehicle for the spare tire. This device is conveniently applied as the accumulator and the sump. The curved surface of the interior of the accumulator casing desirably conforms to a circle which is the same as that of the curved surface of the outside of the cross section of the movable wall hub, and gaskets seal the movable wall against the interior of the casing and the fixed wall against the exterior of the hub along this same circle circumference.

Figure 3:
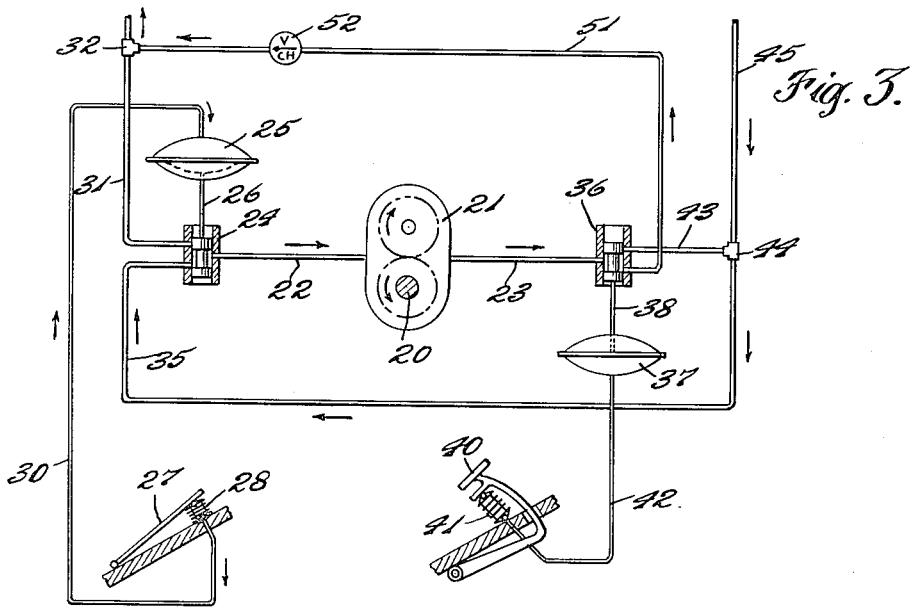

Considering first the form illustrated in Figures 1 to 3, driving shaft 20 is suitably the main drive shaft of the vehicle or other machine, and is interconnected with a fluid pump 21 which is desirably a gear pump of positive displacement type, the relationship with the shaft 20 being such that at one phase of the cycle the shaft will drive the pump and at another phase of the cycle the pump acting as a fluid motor will drive the shaft.

The pump 21 has an inlet line 22 and an outlet line 23. While reference is made herein to the use of fluid, and a gas such as air, or nitrogen may be employed, it is decidedly preferable to use a hydraulic liquid such as oil in the system.

At the inlet side the line 22 is connected to a fluid pilot operated valve 24 having a pilot diaphragm chamber 25 having a diaphragm connected by stem 26 to the valve element, the fluid side of the diaphragm being connected to accelerator pedal 27 by pilot bellows 28 which is urged toward expansion by the inherent spring action of the bellows, and a pilot pipe 30. The valve 24 connects with a pipe 31 passing through one branch of T 32 to sump 33, which is open to the atmosphere at a level above the rest of the equipment through pipe 34. The valve also connects to pipe 35.

The valve 24 has the following positions:

In Figures 1 and 2 pipe 31 connects to pipe 22 and pipe 35 is closed.

In Figure 3, pipe 35 connects to pipe 22 and pipe 31 is closed.

At the outlet side of the pump, pipe 23 connects to pilot fluid operated valve 36 which has a fluid diaphragm chamber 37 which contains the controlling diaphragm which is connected by stem 38 to the valve operating element. A brake pedal 40 suitably pivoted depresses pilot bellows 41 which is inherently spring urged toward expansion and is connected by pilot fluid pipe 42 with the fluid side of the bellows in the bellows chamber 37.

Valve 36 connects by pipe 43 to T 44 which connects with pipe 35 and also with pipe 45 to accumulator 46. The accumulator in this embodiment is suitably of the type which has a flexible diaphragm 47 containing a body of compressed gas 48, which is compressed when fluid is introduced into the space 50 around the diaphragm.

Valve 36 also connects to pipe 51 through check valve 52 to T 32.

Valve 36 has the following positions:

As in Figures 1 and 3, connecting pipe 23 to pipe 51 and closing off pipe 43.

As in Figure 2 connecting pipe 23 to pipe 43 and closing off pipe 51.

In operation, as the vehicle (automobile) or other machine is normally operated without braking, as in Figure 1, diaphragm valve 36 is connected across from pipe 23 to recirculating pipe 51 and check valve 52 in open position through T 32 to sump 33 and also through valve 24 back to the inlet of the pump. During this time the fluid pressure in the accumulator 46 is cut off by valve 36 and also by valve 24 so that no reverse flow from the accumulator can occur.

When it is desired to brake as in Figure 2, a brake pedal 40 is depressed, the pilot diaphragm shifts valve 36 to allow the discharge of fluid from pump 21 through pipe 45 to the accumulator and to cut off the connection between pipe 23 and pipe 51. Under this condition, the pump stores energy by pumping oil or other fluid from sump 33 into the accumulator.

In case abnormal acceleration is desired, accelerator 27 is depressed to push down on bellows 28 and shift valve 24 to connect pipe 35 to pipe 22 so that fluid under pressure from the accumulator is forced through the pump and from the pump into the sump, thereby delivering emergency energy.

In the form of Figures 1 to 3, a separate sump and accumulator are illustrated, but if desired the sump and accumulator can be combined into one vessel having separate chambers.

In Figure 8 I illustrate a cylinder 53 having a floating piston 54 which is urged toward accumulator end 46' by spiral compression spring 55. The space 33' around the spring serves as the sump and as oil or other fluid is always taken from the accumulator to the sump or from the sump to the accumulator, the device can operate in a closed system.

Figure 4:
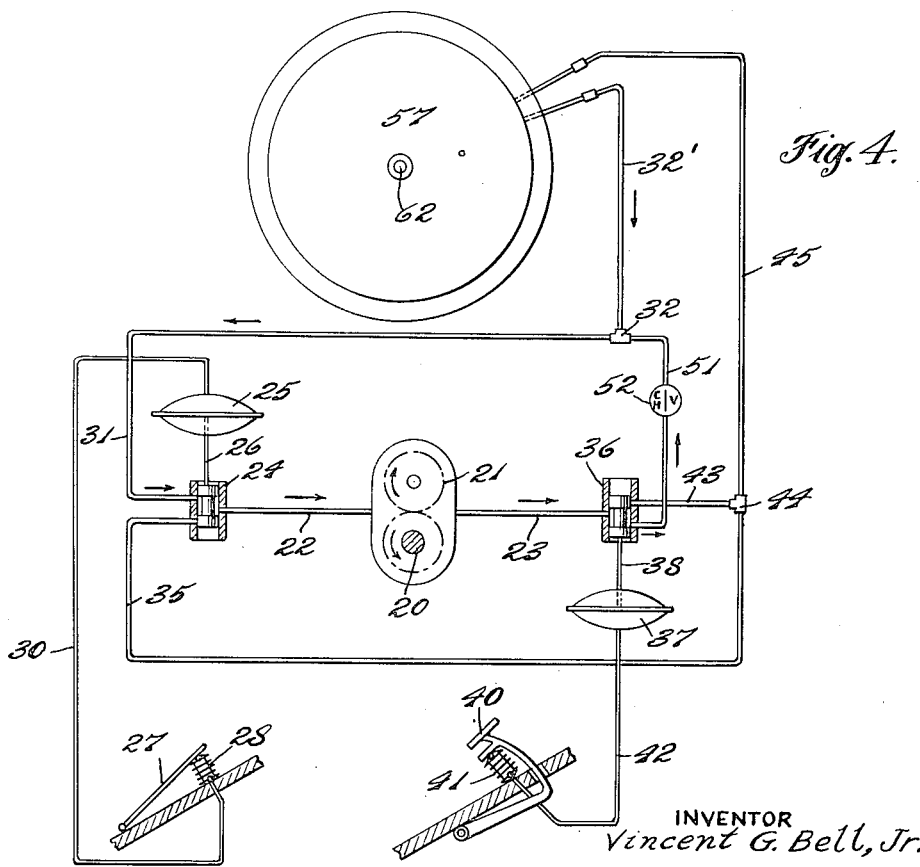
Figure 4 is a view corresponding to Figure 1, showing a combined sump and accumulator.

It is preferred, however, to use a special form of accumulator or combined accumulator and sump as shown in Figures 4, 5 and 6. In this case, a casing 56 is provided having suitable flat ends 57, and on the radial outside interior surface, a surface of revolution 58 which is not only circular when viewed in plan but conforms to a portion of a circle when viewed in cross section as in Figure 6. The casing is desirably made in two halves joined by bolts 60 and gasketed at 61.

At the center of the casing opposed openings are provided through which a bolt 62 extends securing together and bracing the opposite ends.

Surrounding the bolt 62 and co-axial with the casing is a tubular bearing 63 suitably united to one half of the casing as by welding at 64 and extending part only of the distance to the other end.

Surrounding the bearing 63 and journaling thereon is a hub 65 which not only has a circular cross section in plan but at its outer surface 66 conforms to the same circle in cross section (Figure 6) to which the curved surface 58 on the casing conforms. At the ends 67 the hub desirably makes a close fit with the ends 57 of the casing to minimize leakage and unless the pressures are very high to avoid the necessity of gasketing these meeting surfaces at the ends.

A suitable spiral torsional spring 68 rests inside the journal 63 engaging in a spring socket 70 at one end in the journal and in a spring socket 71 at the other end in the hub beyond the end of the journal.

The hub 65 suitably has integral therewith a radially extending movable wall 72 which meets the interior curved surface 58 of the casing in a corresponding curve and carries a gasket 73 which conveniently runs all the way around the circle (Figure 6), although it functions as a gasket only over the outer half of the circumference.

A fixed wall 74 extends suitably radially inwardly from the circumference, ending in a curved portion 75 which conforms with the circle of the interior surface 66 in cross section and carries a gasket 76 which seals on the curved surface 66 of the hub.

The spring tends to return the movable wall clockwise in Figure 5 and the accumulator is the space $46^2$ in Figure 5 connected to the pipe 45 which lies between the movable wall 72 and the fixed wall 74 in a clockwise direction. When the movable wall moves clockwise against the fixed wall, this space $46^2$ never fully closes as the surface 72' of the movable wall is not truly radial. On the other hand the sump is the space $33^2$ between the movable wall 72 and the fixed wall 74 in a counterclockwise direction connected to the pipe 32'. The sump is desirably connected to the atmosphere by a pipe 77 which extends to a position above the highest point of any other part of the equipment and is suitably filled with oil. Of course, if a gaseous fluid is used instead of oil the connection to atmosphere should be omitted.

As considerable heat is developed in the accumulator, it is desirable to apply cooling fins 78 (Figure 7) which extend radially of the casing on both sides.

It will be evident, of course, that where a hydraulic brake system is used, the separate pilot bellows 41 can be omitted by connecting the pilot pipe 42 to the hydraulic braking system.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an accumulator, a circular vessel having end walls and having circumferential interior surfaces which conform to a circle in cross section, a movable hub extending across between the end walls of the vessel and having radially exterior surfaces which conform to the same circle in cross section as the circumferential interior surfaces of the vessel, a movable wall extending radially outwardly from the hub, a gasket sealing the movable wall against the circumferential interior surfaces of the vessel, a fixed wall extending radially inwardly from the vessel, a gasket sealing the fixed wall against the radially outer surfaces of the hub, and connections to the interior spaces of the vessel on opposite sides of the fixed wall.

2. In an accumulator, a circular vessel having end walls and having circumferential interior surfaces which conform to a circle in cross section, a movable hub extending across between the end walls of the vessel and having radially exterior surfaces which conform to the same circle in cross section as the circumferential interior surfaces of the vessel, a movable wall extending radially outwardly from the hub, a gasket sealing the movable wall against the circumferential interior surfaces of the vessel, a fixed wall extending radially inwardly from the vessel, a gasket sealing the fixed wall against the radially outer surfaces of the hub, connections to the interior spaces of the vessel on opposite sides of the fixed wall, and a torsion spring urging the movable wall toward one limiting position.

3. In an accumulator, a circular vessel having end walls and having circumferential interior surfaces which conform to a circle in cross section, a movable hub extending across between the end walls of the vessel and having radially exterior surfaces which conform to the same circle in cross section as the surfaces of the vessel, a movable wall extending radially outwardly from the hub, a gasket sealing the movable wall against the circumferential interior surfaces of the vessel, a fixed wall extending radially inwardly from the vessel, a gasket sealing the fixed wall against the radially outer surfaces of the hub, connections to the interior spaces of the vessel on opposite sides of the fixed wall, a torsion spring urging the movable wall toward one limiting position and cooling fins on the casing.

4. In mechanism for storing the energy of a vehicle having driving means including a drive shaft, an accelerator having a range of lower energy operation during which it is operatively connected to accelerate the driving means, a fluid pump operatively connected to the driving shaft, a sump, an accumulator, incompressible hydraulic liquid in the sump and in the accumulator, the accumulator having energy storing means therein, and valve means for controlling recirculation of liquid through the pump without developing appreciable pumping pressure in lower energy operation, operative upon braking the vehicle for connecting hydraulic liquid from the sump through the pump to the accumulator to store energy therein, and operatively connected to the accelerator when it is positioned beyond the range of lower energy operation for connecting the accumulator through the pump to the sump and thereby applying additional energy to the driving shaft.

5. Mechanism according to claim 4, in which the accumulator and sump comprise a vessel having a movable piston-like wall and spaces on opposite sides thereof, the piston-like wall sealing to the vessel, the space on one side of the piston-like wall comprising the sump and the space on the other side of the piston-like wall comprising the accumulator, and spring means urging the movable piston-like wall in a direction to restrict the accumulator space.

6. Mechanism according to claim 4, in which the accumulator and sump comprise a circular vessel having a radial circumferentially movable wall pivoted at the center of the vessel and swingable about the interior, the movable wall being sealed to the interior of the vessel to separate the same into two spaces, a fixed wall extending radially across the interior in one position and sealed to the movable wall, the space between the movable and fixed walls on one side of the movable wall forming the sump and on the other side of the movable wall forming the accumulator, and spring means urging the movable wall in a direction to restrict the accumulator space.

References Cited in the file of this patent

UNITED STATES PATENTS

| | | |
|---|---|---|
| 2,290,932 | Aikman | July 28, 1942 |
| 2,385,901 | Williams | Oct. 2, 1945 |
| 2,525,946 | Roberts | Oct. 17, 1950 |

FOREIGN PATENTS

| | | |
|---|---|---|
| 570,191 | Great Britain | Aug. 13, 1943 |